United States Patent [19]

Graham

[11] Patent Number: 5,412,352
[45] Date of Patent: May 2, 1995

[54] MODULATOR HAVING DIRECT DIGITAL SYNTHESIS FOR BROADBAND RF TRANSMISSION

[75] Inventor: Hatch Graham, Morgan Hill, Calif.

[73] Assignee: Stanford Telecommunications, Inc., Sunnyvale, Calif.

[21] Appl. No.: 228,808

[22] Filed: Apr. 18, 1994

[51] Int. Cl.⁶ ............................................. H03C 3/00
[52] U.S. Cl. ................................... 332/103; 375/257; 375/279; 375/308
[58] Field of Search ...................... 332/103, 104, 105; 307/512; 375/36, 52–57, 67; 370/12, 122

[56] References Cited

U.S. PATENT DOCUMENTS

| | | | |
|---|---|---|---|
| Re. 32,327 | 1/1987 | Biba et al. | 370/124 |
| 4,498,169 | 2/1985 | Rozmus | 370/85 |
| 4,962,510 | 10/1990 | McDavid et al. | 375/67 |
| 5,084,903 | 1/1992 | McNamara et al. | 375/18 |
| 5,091,705 | 2/1992 | Hiramatsu et al. | 375/67 X |
| 5,121,412 | 6/1992 | Borth | 332/104 X |
| 5,157,693 | 10/1992 | Lemersal, Jr. et al. | 332/103 X |
| 5,172,394 | 12/1992 | Kuster et al. | 375/67 |
| 5,175,514 | 12/1992 | Iinuma et al. | 375/53 X |
| 5,325,396 | 6/1994 | Critchlow et al. | 375/67 X |
| 5,369,378 | 11/1994 | Kosaka et al. | 332/104 |

OTHER PUBLICATIONS

Stanford Telecom, ASIC Custom Products Division Brochure entitled "Block Phase Estimator STEL-2211", Oct. 19, 1993.
Stanford Telecom, ASIC Custom Products Division Brochure entitled "Dual 64-TAP, 11 Mcps Digital Matched Filter STEL 3340", Jul. 1993.
Stanford Telecom, ASIC Custom Products Division Brochure entitled "32-Bit Resolution CMOs Phase and Frequency Modulated Numerically Controlled Oscillator STEL-1177", Jun. 1993.
Stanford Telecom, ASIC Custom Products Division Brochure entitled "Introduction to Direct Digital Synthesis", Jun. 1991.
Lyford et al., "Telephony over cable: CISN and CLC-500", *Communications Technology* 54: 46, 70, 72, 73 (Dec. 1993).

*Primary Examiner*—David Mis
*Attorney, Agent, or Firm*—Townsend and Townsend Khourie and Crew

[57] ABSTRACT

A modulator for data transmitted in a reverse channel or upstream spectrum in a cable transmission system requires a single frequency translation from baseband to a selected RF channel, thus eliminating conventional intermediate frequency (IF) translation. The modulator requires fewer components than the conventional modulator while eliminating nonlinearity, noise, and delay introduced by the IF upconversion. In a preferred embodiment, the modulator includes a serial to parallel differential quadrature phase shift keying encoder with transversal FIR filters and interpolation filters connecting the phase shift keyed data to a single mixer stage for directly translating the baseband signal to an RF (e.g., 5–40 MHz) channel spectrum.

5 Claims, 3 Drawing Sheets though the reverse channel from 5–40 MHz is a small portion of the band, data such as digital voice, digital video and the like must still be transmitted through this reverse channel. Accordingly, an efficient modulator is required for data transmission through the reverse channel from each subscriber.

MODULATOR HAVING DIRECT DIGITAL SYNTHESIS FOR BROADBAND RF TRANSMISSION

BACKGROUND OF THE INVENTION

This invention relates generally to data transmission systems, and more particularly the invention relates to a signal modulator for data transmitted in a cable transmission system.

Much attention is being directed to converting unidirectional analog data transmission systems, such as the community antenna television (CATV) cable system into more versatile bidirectional communication systems. Today, over 60 million households in the United States enjoy the benefits of cable TV, virtually all of the information which travels into the home over the cable is in the form of analog television signals. Some subscribers now have the ability to send digital commands to select movies or provide other forms of low rate data information from the home to a central location. However, in the next few years the rate of digital information both entering and leaving the home over the CATV cable will increase dramatically.

Capabilities now being envisioned to exploit the band width of the cable include all conventional telephony services and a variety of multimedia capabilities including digital video or high speed "video phone", remote video games, high speed data and a wide variety of consumer purchasing and voting services. As the computer is merged with the cable, the consumer will be able to rent movies, play games, take college courses, make travel plans, trade stocks, and the like.

Traditionally, cable data transmission systems provide one-way transmission, from head-end to subscriber, or the forward channel in a frequency spectrum up to 750 MHz. Typically, the spectrum from 54–550 MHz is dedicated to analog video for the forward channel, 550–700 MHz is dedicated to digital video, and 700–750 MHz is dedicated to voice and multimedia in the forward channel. To satisfy the requirement for interactivity in the information superhighway, a return path has to be provided. Cable operators have allocated a frequency spectrum of 5–40 MHz for this reverse channel.

The present invention is directed to apparatus for providing a modulated tunable signal by direct frequency synthesis directly to the cable medium, particularly from a subscriber to the head end unit in the reverse channel, without the use of an upconverter.

SUMMARY OF THE INVENTION

In accordance with the invention, a modulator is provided for use in the 5–40 MHz reverse channel and which requires a single frequency translation from baseband to RF, thus eliminating the conventional intermediate frequency, IF, translation. The modulator requires fewer components than a conventional modulator, while eliminating nonlinearity, noise, and delay introduced by the IF upconversion.

In a preferred embodiment, the modulator includes filter means for receiving and digitally sampling an input data stream and providing a sampled data stream. Mixer means, including a tunable oscillator, receives the sampled data stream and provides an RF data stream in selected frequency bands. A digital to analog converter then receives the RF data stream and converts the digital data to an analog signal for direct application to a cable transmission system.

In one embodiment, the filter means includes means for translating serial input data into parallel data and then encoding the data using differential quadrature phase shift keying. The filter means further includes transversal finite impulse response (FIR) filter means for digitally sampling the in-phase and quadrature phase encoded data, and an interpolation filter provides additional control data for the sampled encoded data. The tunable oscillator in the mixer means includes a numerically controlled oscillator for providing modulation signals for in phase and quadrature phase mixers which step the encoded data directly to an RF signal having a frequency in the spectrum of the reverse channel, such as 5–40 MHz.

The invention and objects and features thereof will be more readily apparent from the following detailed description and appended claims when taken with the drawing.

DETAILED DESCRIPTION OF ILLUSTRATIVE EMBODIMENTS

Figure 1:
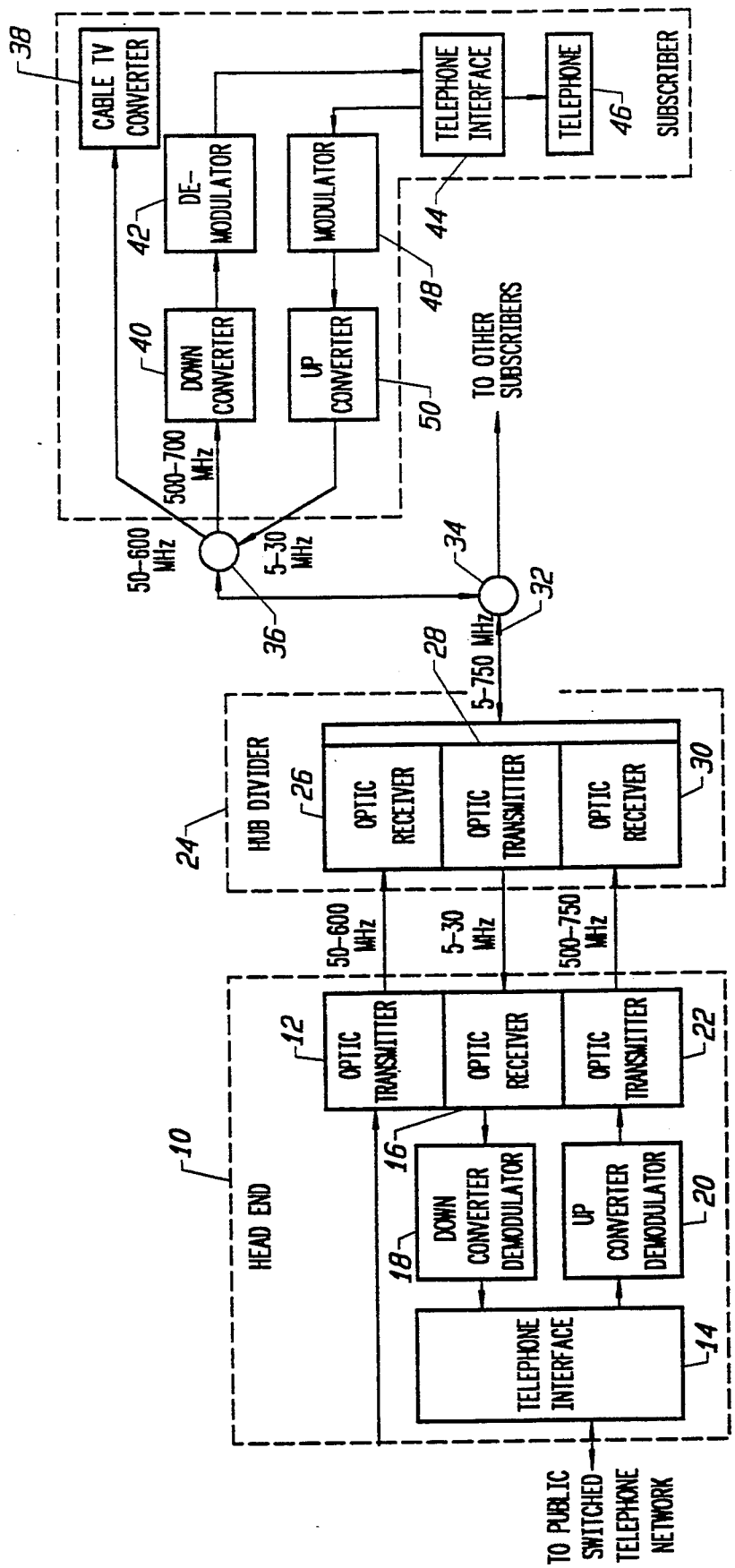
FIG. 1 is a functional block diagram of a high-speed, bidirectional digital cable transmission system in which the present invention has applicability.
Figure 4:
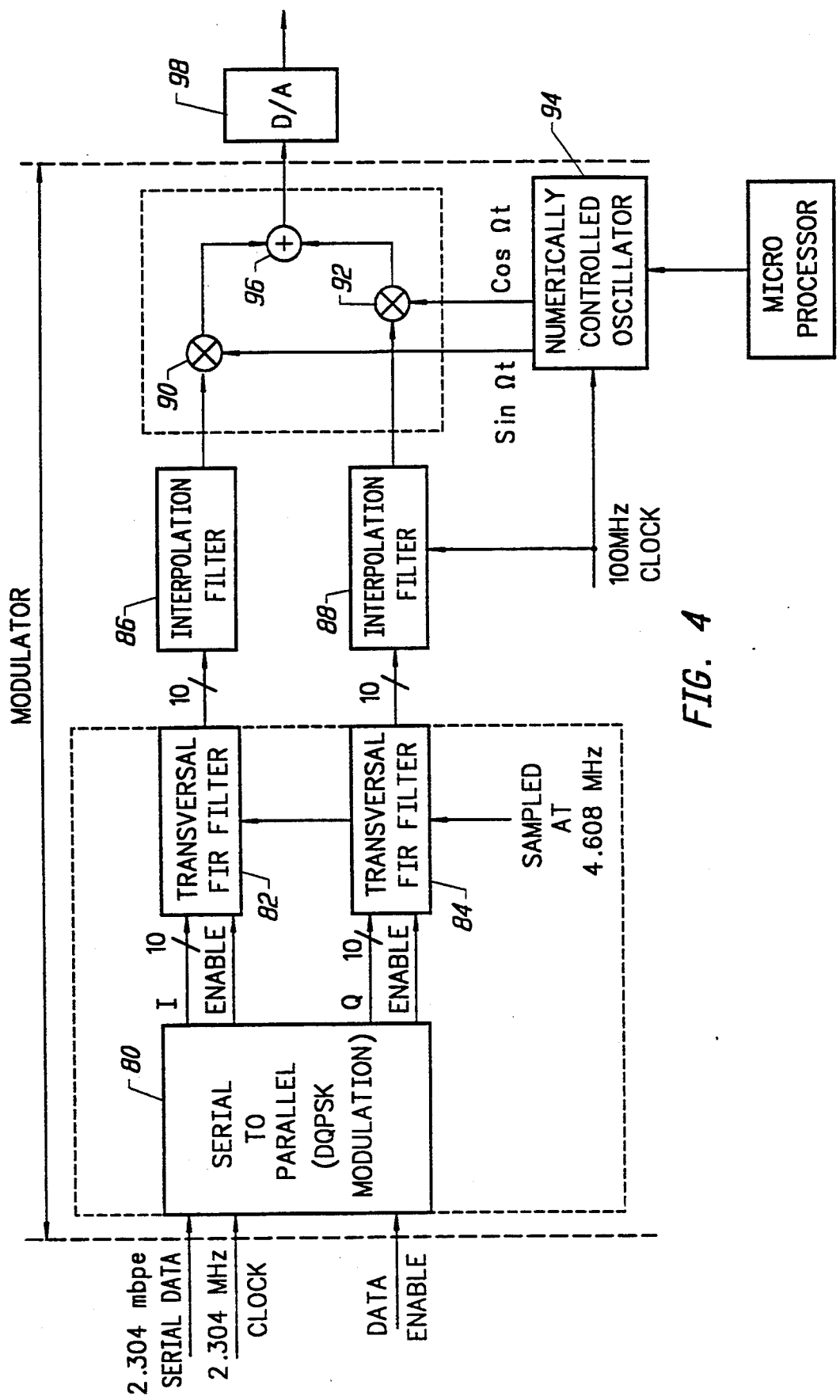
FIG. 4 is a more detailed functional diagram for a modulator in accordance with the invention.

Referring now to the drawing, FIG. 1 is a functional block diagram of a conventional high speed bidirectional digital cable transmission system in which the invention has applicability. The head end unit 10 comprises optical cable transmission lines and includes an optic transmitter 12 for the transmission of entertainment (e.g., movies, games, and the like) over a frequency band of 50–600 MHz and a telephone interface 14 for interfacing between a public switch telephone network and telephone or voice signals from subscribers. As will be described further hereinbelow, the incoming voice signals are transmitted in bursts in 6 MHz frequency channels between 5 and 40 MHz. The burst signals are received by an optical receiver 16 which applies the signal to the downconverter/demodulator 18. The downconverter/demodulator 18, described further hereinbelow with reference to FIG. 4, provides digital voice signals to the telephone interface 14. An upconverter/modulator 20, described further hereinbelow with reference to FIG. 2, converts analog voice signals from the telephone interface 14 to digital data which are then coded and upconverted in frequency for transmission to optic transmitter 22 which transmits the encoded data using time division multiplexing in the frequency bands between 500 and 750 MHz. A hub divider 24 includes an optic receiver 26, an optic transmitter 28, and an optic receiver 30 for interfacing between the optical cable of the head end unit and the coaxial cable 32 of the transmission system.

Data is continuously transmitted through the coaxial cable 32 to subscribers in multiple channels with the data being broadcast to all subscribers. Each subscriber is connected to the coaxial line by means of a tap 34 which is connected through a directional coupler/splitter 36 for providing entertainment system signals in the 50–600 MHz band to a cable TV converter 38. Voice signals in the 500–700 MHz range are downconverted at 40 and demodulated at 42 and applied to telephone interface 44 to a telephone 46. Voice signals from the telephone 46 are applied to the telephone interface 44, modulator 48, and upconverter 50 through the directional coupler and tap 34 as a burst of data using time division multiple access in an upstream channel to the head end 10.

Figure 2:
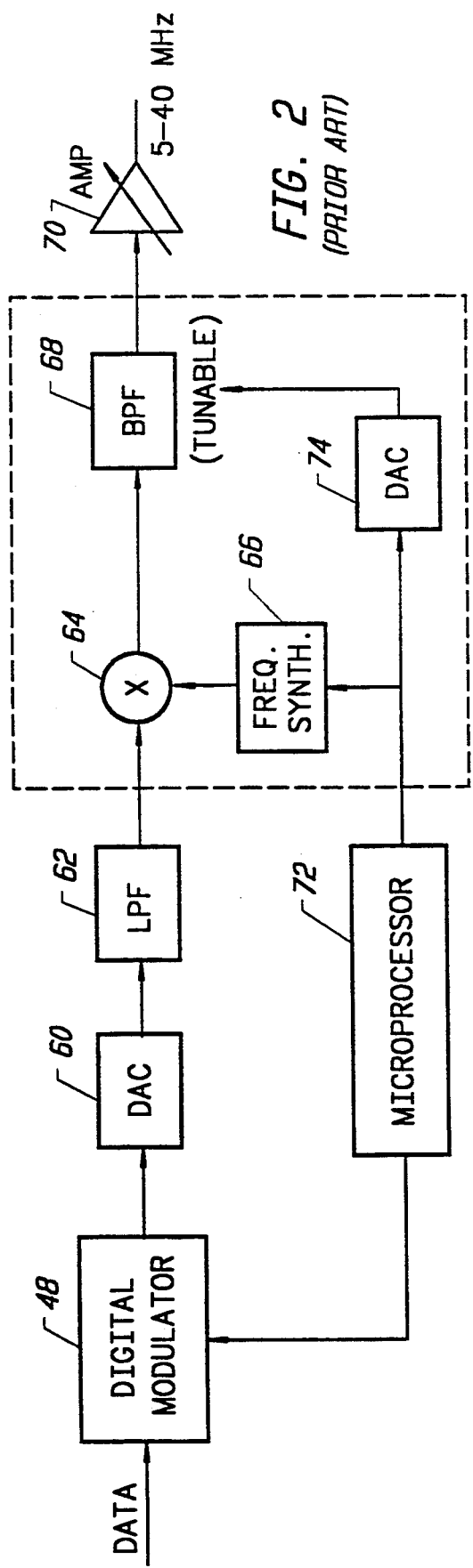
FIG. 2 is a functional block diagram of a conventional signal modulator including an intermediate frequency (IF) stage.

FIG. 2 is a block diagram of a conventional modulator which employs an intermediate frequency (IF) stage and an upconverter in translating a baseband signal to the RF frequency for transmission in a cable. The modulator 48 receives the baseband data (e.g., audio signals) and steps the baseband signal up to an intermediate frequency such as 5 MHz. The IF signal is then applied through a digital to analog converter 60 and through a lowpass filter 62 to an upconverter mixer 64. The mixer 64 receives a selected carrier frequency from the frequency synthesizer 66 which steps the IF frequency up to the selected frequency (e.g., 5–40 MHz) for the reverse channel. The RF signal is passed through a bandpass filter 68 and amplifier 70 to the cable. Control of the digital modulator 48 and of the frequency synthesizer 66 is effected by a microprocessor 72 which also provides a control signal through a digital to analog converter 74 to the tunable bandpass filter 68.

Figure 3:
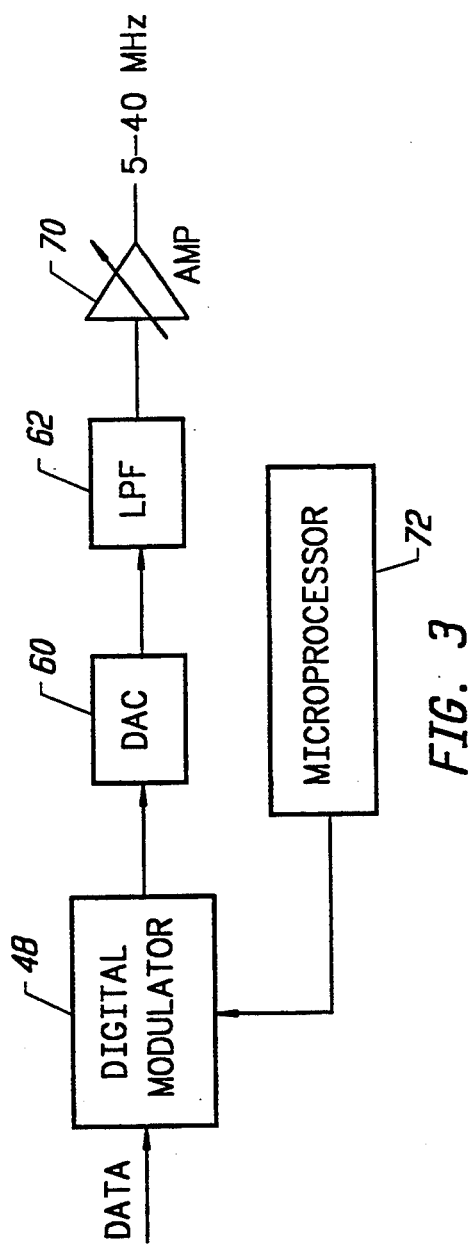
FIG. 3 is a functional block diagram of a signal modulator for directly modulating a baseband signal to an RF signal for transmission.

By employing an intermediate frequency in the modulation scheme of FIG. 2, a certain amount of nonlinearity, noise, and delay is introduced in the frequency upconversion. In accordance with the present invention, these undesirable characteristics are eliminated by eliminating the IF stage of the modulator. FIG. 3 is a functional block diagram of a modulator in accordance with the invention in which like elements in FIGS. 2 and 3 have the same reference numerals. Thus, microprocessor 72 again controls a digital modulator 48, but the digital modulator directly provides the RF carrier signal as an output which is passed through the digital to analog converter 60, lowpass filter 62, and directly to amplifier 70, while eliminating the upconverter frequency synthesizer 66 and mixer 64 from the modulator of FIG. 2. Thus, the modulator provides direct digital frequency synthesis for direct frequency-agile transmission on a cable such as a CATV cable system.

FIG. 4 is a more detailed functional block diagram of the upconverter/modulator in accordance with the invention. Serial data is received by a serial to parallel converter and DQPSK modulator 80 along with a 2.304 MHz clock and a data enable signal. The data enable signal is a "1" or continuous for the continuous transmission at the head end unit, and the data enable is a toggled signal at the subscriber for the generation of data bursts.

In-phase and quadrature phase modulated signals from the phase shift keyed modulator are applied to transverse finite impulse response (FIR) filters 82, 84, along with enable signals. Each filter has 32 stages which are sampled at 4.608 MHz.

The sampled data from the FIR filters 82, 84 are then applied through interpolation filters 86, 88 to provide additional data for mixers 90, 92. The sampled and interpolated data are mixed with sine and cosine signals from numerically controlled oscillator 94 which are then summed at 96 and applied through a digital to analog converter 98 which provides the analog RF output signal to the reverse channel for transmission upstream to the head end unit. The numerically controlled oscillator 94 is driven by a 100 MHz clock and can provide a mixer signal up to 40% of the clock, or 40 MHz, which is sufficient to step through the 5–40 MHz (Nyquist limit) frequency spectrum of the reverse channel. A subsequent frequency upconverter is not required as in the conventional modulator of FIG. 2.

Thus, a reverse channel modulator for a bidirectional cable system is provided for directly providing an RF signal from the baseband input signal and eliminates the IF stage and adverse effects thereof. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. An RF modulator for reverse channel baseband to RF frequency translation in a CATV cable data transmission system comprising
    means; for receiving and digitally sampling an input data stream and providing a sampled digital data stream,
    digital mixer means including a digitally tunable oscillator for receiving said sampled digital data stream and providing a digital RF data stream in selected frequency bands, said mixer means including in-phase and quadrature phase mixers and a numerically controlled oscillator driven by a 100 MHz clock for modulating said in-phase and quadrature phase digital data stream to a selected RF frequency band in the range of 5–40 MHz, and an adder for combining said in-phase and quadrature phase digital data streams.

2. The RF modulator as defined by claim 1 wherein said filter means includes means for translating serial input data into parallel data.

3. The RF modulator as defined by claim 2 wherein said means for translating serial input data into parallel data further includes differential quadrature phase shift keying means.

4. The RF modulator as defined by claim 3 wherein said filter means further includes transversal finite impulse response (FIR) filter means for digitally sampling said differential quadrature phase shift keyed signals.

5. The RF modulator as defined by claim 4 and further including interpolation filter means for providing additional control data to said sampled data stream.

* * * * *